United States Patent
Nishimori et al.

(10) Patent No.: US 9,424,174 B2
(45) Date of Patent: Aug. 23, 2016

(54) CONTROL APPARATUS AND METHOD FOR CONTROLLING A MEMORY HAVING A PLURALITY OF BANKS

(71) Applicant: CANON KABUSHIKI KAISHA, Tokyo (JP)

(72) Inventors: Koji Nishimori, Kawasaki (JP); Hideyuki Rengakuji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 256 days.

(21) Appl. No.: 13/942,039

(22) Filed: Jul. 15, 2013

(65) Prior Publication Data

US 2014/0025867 A1    Jan. 23, 2014

(30) Foreign Application Priority Data

Jul. 20, 2012  (JP) ................. 2012-161964

(51) Int. Cl.
*G06F 12/00*  (2006.01)
*G06F 12/02*  (2006.01)
*G06F 12/06*  (2006.01)

(52) U.S. Cl.
CPC .......... *G06F 12/023* (2013.01); *G06F 12/0246* (2013.01); *G06F 12/0607* (2013.01); *G06F 12/0238* (2013.01); *Y02B 60/1225* (2013.01)

(58) Field of Classification Search
None
See application file for complete search history.

(56) References Cited

U.S. PATENT DOCUMENTS

| | | | | |
|---|---|---|---|---|
| 5,375,250 A | * | 12/1994 | Van den Heuvel | 706/41 |
| 5,960,462 A | * | 9/1999 | Solomon et al. | 711/172 |
| 2005/0210206 A1 | * | 9/2005 | Woodbridge et al. | 711/154 |

FOREIGN PATENT DOCUMENTS

| | | |
|---|---|---|
| JP | S52-068331 A | 6/1977 |
| JP | H09-212416 A | 8/1997 |
| JP | 2005-26912 A | 1/2005 |
| JP | 2011-018222 A | 1/2011 |
| WO | 2011/046788 A2 | 4/2011 |

OTHER PUBLICATIONS

Japanese Office Action issued in corresponding Application No. JP2012161964 on May 23, 2016 (4 pages).

* cited by examiner

*Primary Examiner* — Midys Rojas
(74) *Attorney, Agent, or Firm* — Carter, DeLuca, Farrell & Schmidt, LLP

(57) ABSTRACT

A control apparatus which controls a memory having a plurality of banks, allocates the plurality of banks to a first region and a second region, wherein data transfer is performed by interleaving access in a plurality of banks in the first region, and data transfer is performed by non-interleaving access in at least one bank in the second region. The control apparatus sets a bank in the first region and a bank in the second region independently to a low-power state.

15 Claims, 8 Drawing Sheets

| PHYSICAL ADDRESS | | | LOGICAL ADDRESS |
|---|---|---|---|
| BANK | ROW | COLUMN | |
| 210 | 0 | 0 | ADDRESS 4001 |
| 210 | 0 | 1 | ADDRESS 4002 |
| 210 | 1 | 0 | ADDRESS 4003 |
| 210 | 1 | 1 | ADDRESS 4004 |

FIG. 6B

| PHYSICAL ADDRESS | | | LOGICAL ADDRESS |
|---|---|---|---|
| BANK | ROW | COLUMN | |
| 213 | 0 | 0 | ADDRESS 4012 |
| 213 | 0 | 1 | ADDRESS 4013 |
| 213 | 1 | 0 | ADDRESS 4014 |
| 213 | 1 | 1 | ADDRESS 4015 |

FIG. 6C

| | | BANK' 211 | | BANK' 212 | |
|---|---|---|---|---|---|
| | | COLUMN | | COLUMN | |
| | | 0 | 1 | 0 | 1 |
| ROW | 0 | 4004 | 4006 | 4005 | 4007 |
| | 1 | 4008 | 4010 | 4009 | 4011 |

FIG. 6D

| PHYSICAL ADDRESS | | | LOGICAL ADDRESS |
|---|---|---|---|
| BANK | ROW | COLUMN | |
| 211 | 0 | 0 | ADDRESS 4004 |
| 212 | 0 | 0 | ADDRESS 4005 |
| 211 | 0 | 1 | ADDRESS 4006 |
| 212 | 0 | 1 | ADDRESS 4007 |
| 211 | 1 | 0 | ADDRESS 4008 |
| 212 | 1 | 0 | ADDRESS 4009 |
| 211 | 1 | 1 | ADDRESS 4010 |

FIG. 7

| PHYSICAL ADDRESS | | | LOGICAL ADDRESS |
|---|---|---|---|
| BANK | ROW | COLUMN | |
| 210 | 0 | 0 | ADDRESS 4001 |
| 210 | 0 | 1 | ADDRESS 4002 |
| 210 | 1 | 0 | ADDRESS 4003 |
| 210 | 1 | 1 | ADDRESS 4004 |
| 211 | 0 | 0 | ADDRESS 4004 |
| 212 | 0 | 0 | ADDRESS 4005 |
| 211 | 0 | 1 | ADDRESS 4006 |
| 212 | 0 | 1 | ADDRESS 4007 |
| 211 | 1 | 0 | ADDRESS 4008 |
| 212 | 1 | 0 | ADDRESS 4009 |
| 211 | 1 | 1 | ADDRESS 4010 |
| 212 | 1 | 1 | ADDRESS 4011 |
| 213 | 0 | 0 | ADDRESS 4012 |
| 213 | 0 | 1 | ADDRESS 4013 |
| 213 | 1 | 0 | ADDRESS 4014 |
| 213 | 1 | 1 | ADDRESS 4015 |

FIG. 8

CONTROL APPARATUS AND METHOD FOR CONTROLLING A MEMORY HAVING A PLURALITY OF BANKS

BACKGROUND OF THE INVENTION

1. Field of the Invention

The present invention relates to a memory control apparatus and method for controlling access to storage regions configured by a non-volatile memory.

2. Description of the Related Art

In recent years, magnetoresistive random access memories (referred to as MRAM below) that use magnetic material have gained attention. An MRAM is a memory that stores information using magnetism, is non-volatile, and realizes high-speed access performance on par with that of a static RAM (referred to as SRAM below). In addition to being able to function in place of a conventional dynamic RAM (referred to as DRAM below) due to these characteristics, it can also configure a memory system that continues to maintain storage even if powered off, which cannot be realized with an SRAM or a DRAM. Also, since storage is a mechanism that is maintained by a magnetic effect, the circuitry does not become complicated as with an SRAM that uses flip flop circuits in a storage unit, and it is easy to increase its capacity.

A wireless apparatus proposed in Japanese Patent Laid-Open No. 2005-26912 (hereinafter referred to as Patent Document 1) is an example in which a main memory of an apparatus is configured using a non-volatile main memory. Patent Document 1 discloses that effects such as reducing power consumption by reducing the amount of non-volatile memory can be obtained by using an MRAM that maintains a storage state even when power is turned off as a main memory for an apparatus.

According to the configuration of Patent Document 1, since memory use is switched between two main memories configured by the MRAM, power saving can be achieved by powering off the main memory that is not in use. However, in Patent Document 1, there is no idea of achieving power saving by switching off a power supply to a portion of the storage regions (e.g., memory banks) in the main memory that is in use. In memory systems in general, the arrangement of data and programs in a memory region is complicated. For example, if a memory region is configured by multiple memory banks (also called "banks" below), it is also possible that programs and data are stored so as to span multiple banks. Also, there is a possibility that programs and data will both be included in one bank. In particular, if an interleaving method of memory access is employed in order to speed up readout and writing of data, the complexity increases. Accordingly, in these types of cases, it is extremely difficult to accurately determine which banks can be controlled so as to be powered on or off. Because of this, it has been difficult to realize power saving by performing powering on/off in units of banks.

SUMMARY OF THE INVENTION

According to an embodiment of the present invention, it is possible to realize power consumption reduction by performing powering on/off in a memory space where interleaving regions and non-interleaving regions are included together.

According to one embodiment of the present invention, there is provided a control apparatus for controlling a memory having a plurality of banks, comprising: an allocation unit configured to allocate the plurality of banks to a first region and a second region, data transfer being performed by interleaving access in a plurality of banks in the first region, and data transfer being performed by non-interleaving access in at least one bank in the second region; and a control unit configured to set a bank in the first region and a bank in the second region independently to a low-power state.

Further features of the present invention will become apparent from the following description of exemplary embodiments with reference to the attached drawings.

DESCRIPTION OF THE EMBODIMENTS

Below, several embodiments of the present invention will be described with reference to the drawings.

First Embodiment

First, the configuration related to the problem-to-be-solved of the present proposal will be described before the configuration and effects of the embodiments are described.

Memory interleaving (hereinafter referred to as "interleaving") is an important mechanism when increasing the speed of memory access by reducing latency from when a CPU requests access to a memory, until when data is actually read out or the writing of data is complete. With interleaving, sequential addresses are assigned alternatingly to a plurality of memory banks so as to span multiple memory banks, and the delay period in which the memory access to one bank is performed is used to issue a request for access to the next bank address. Because of this, time can be used effectively, and the efficiency of memory access improves.

Figure 1:
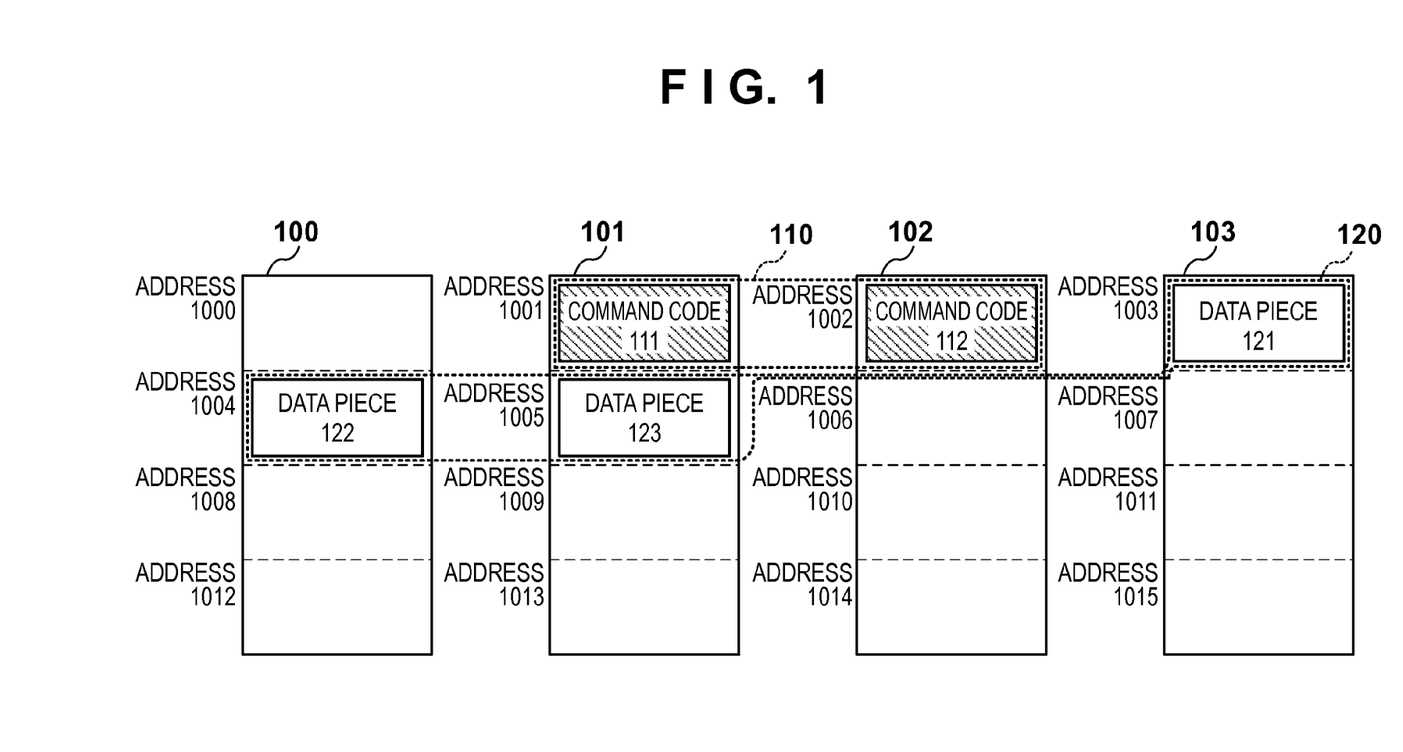
FIG. 1 is a diagram for describing a common interleaving configuration.

If interleaving is performed, the use of memory spaces such as those shown in FIG. 1 for example, is conceivable. An example of interleaving using four banks, namely banks 100 to 103, is shown in FIG. 1. A program 110, which is stored on a memory, spans multiple banks (banks 101 and 102), and data 120, which is used by this program, is stored such that it spans multiple banks (banks 100, 101, and 103). In view of this, if high-speed access from a CPU or another peripheral device is needed for the data 120 for example, high-speed access can be realized by the characteristics of interleaving.

Here, a case is considered in which interleaving is performed in a memory system that uses a non-volatile memory (e.g., an MRAM). A non-volatile memory continues to maintain storage even when the power is off. Therefore, if a portion of data or a program, or the entirety thereof is in an unused state when the apparatus is in a specified state for example, a method can be used in which power is temporarily cut off to the bank that stores the data or the program not being used, and the power supply thereto is switched on according to need. It is apparent that this kind of electric power control contributes to power saving.

Next, consider a more efficient method of storing a program or data in the case where a power supply to the banks is switched on or off as needed in this memory system. FIG. 1 shows a state in which all banks are in an interleaving configuration in a memory region composed of banks 100, 101, 102, and 103, which are configured by a non-volatile memory. A case will be considered in which the program 110 composed of command codes 111 and 112, and the data 120 composed of data pieces 121, 122, and 123 are stored as shown in FIG. 1. In this case, during a state in which there is temporarily no access to the data 120 from the CPU or a peripheral device (not shown), power can be reduced by powering off the banks that store the data 120.

At this time, the banks 100 and 103 store only the data pieces 122 and 121 respectively, and do not store the command codes for the program 110. Therefore, if there is temporarily no access to the data 120, the execution of the program 110 is not hindered even if the banks 100 and 103 are powered off. However, the bank 101 stores not only the data piece 123, but also the command code 111 for the program 110. Accordingly, if the bank 101 is powered off while this program 110 is running, the execution of the program 110 will be hindered, and therefore the power for the bank 101 cannot be turned off, even in the case where there is no access to the data 120.

Figure 2A:
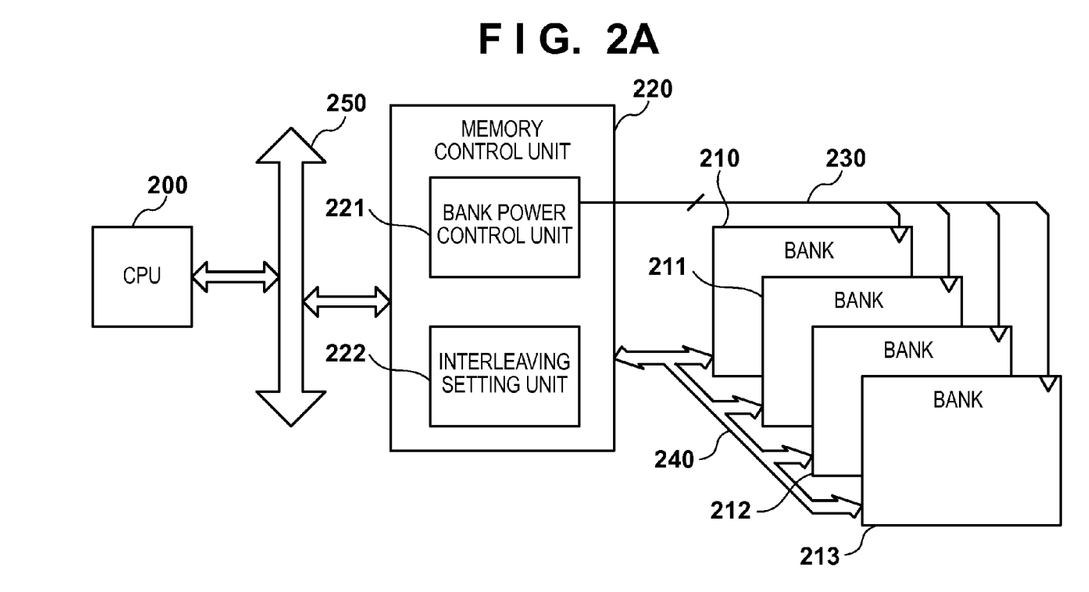
FIG. 2A is a diagram showing an example of a configuration of a memory system according to a first embodiment.

Next, a memory access apparatus functioning as the memory control apparatus of the present embodiment will be described with reference to FIGS. 2A to 2C. FIG. 2A is a block diagram showing an example of a configuration of a memory system that includes the memory access device according to the present embodiment. A CPU 200 is a central processing unit that performs readout and writing access to a memory, and banks 210, 211, 212, and 213 are memory banks composed of a non-volatile memory. A memory control unit 220 is a circuit that performs control of memory access to memory regions configured by the banks 210, 211, 212, and 213. A bank power control unit 221 is a control circuit that includes a register for setting the power on/off state of the banks 210, 211, 212, and 213. An interleaving setting unit 222 is a circuit for setting whether to handle the banks as interleaving regions or non-interleaving regions.

A bank power control line 230 is a signal line that connects the bank power control unit 221 to each of the banks 210, 211, 212, and 213, and is for controlling the power for the banks based on the power on/off state of the banks, which is set in the bank power control unit 221. A memory bus 240 is a bus that connects the banks 210, 211, 212, and 213 with the memory control unit 220, and is composed of an address line and a data line for memory access, as well as a control line. A system bus 250 is a bus that connects the CPU 200 with the memory control unit 220 or with a peripheral device (not shown).

Figure 2B:
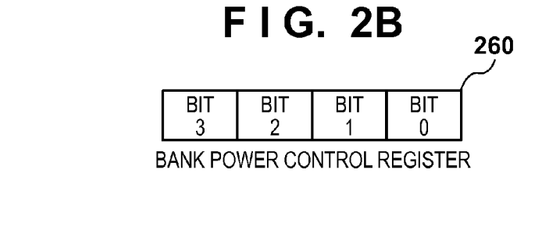
FIG. 2B is a diagram for describing a bank power control register.

FIG. 2B shows a bank power control register 260 that is included in the bank power control unit 221. The bank power control register 260 holds information that indicates whether the power supply to each of the multiple banks is on or off. In this embodiment, the bank power control register 260 is composed of four bits, and bits 0, 1, 2, and 3 correspond to the banks 210, 211, 212, and 213 respectively. When a bit value in the bank power control register 260 is 0, the bank power control unit 221 switches off the power supply for the bank corresponding to that bit, and when the value is 1, it switches on the power supply for the bank corresponding to that bit.

Figure 2C:
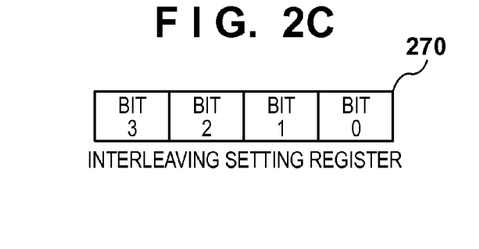
FIG. 2C is a diagram for describing an interleaving setting register.

FIG. 2C shows an interleaving setting register 270 that is included in the interleaving setting unit 222. The interleaving setting register holds setting information that indicates whether each of the multiple banks is set to be an interleaving region or a non-interleaving region. In the present embodiment, the interleaving setting register 270 is composed of four bits, and bits 0, 1, 2, and 3 correspond to the banks 210, 211, 212, and 213 respectively. When a bit value in the interleaving setting register 270 is 0, the interleaving setting unit 222 sets an address for the bank corresponding to that bit such that it will be accessed as a non-interleaving region, or as an interleaving region if the bit value is 1. Note that the setting of addresses in interleaving regions and non-interleaving regions will be described in detail with reference to FIG. 3C.

Figure 3A:
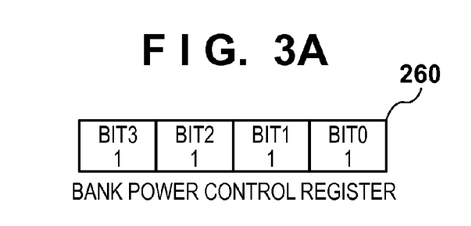
FIG. 3A is a diagram showing a setting state of the bank power control register according to the first embodiment.
Figure 3B:
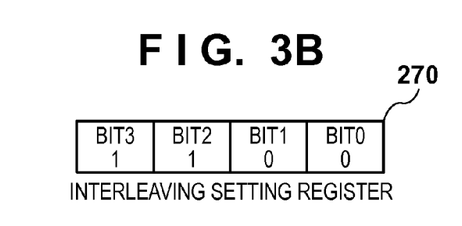
FIG. 3B is a diagram showing a setting state of the interleaving setting register.

Next, with reference to FIGS. 3A, 3B, and 3C, an example will be described in which interleaving setting is actually performed with the memory system shown in FIGS. 2A to 2C, and electric power control for the banks is performed. FIG. 3A shows a state in which all of the bits 0 to 3 in the bank power control register 260 shown in FIG. 2B have been set to 1. In this case, the bank power control unit 221 sets the power supply for all of the banks 210 to 213 to the on state, and power is supplied to all of the banks. Also, FIG. 3B shows a state in which bits 0 and 1 in the interleaving setting register 270 shown in FIG. 2C have been set to 0, and bits 2 and 3 have been set to 1. In this case, the banks 210 and 211 are set to be non-interleaving, and the banks 212 and 213 are set to be interleaving.

Figure 3C:
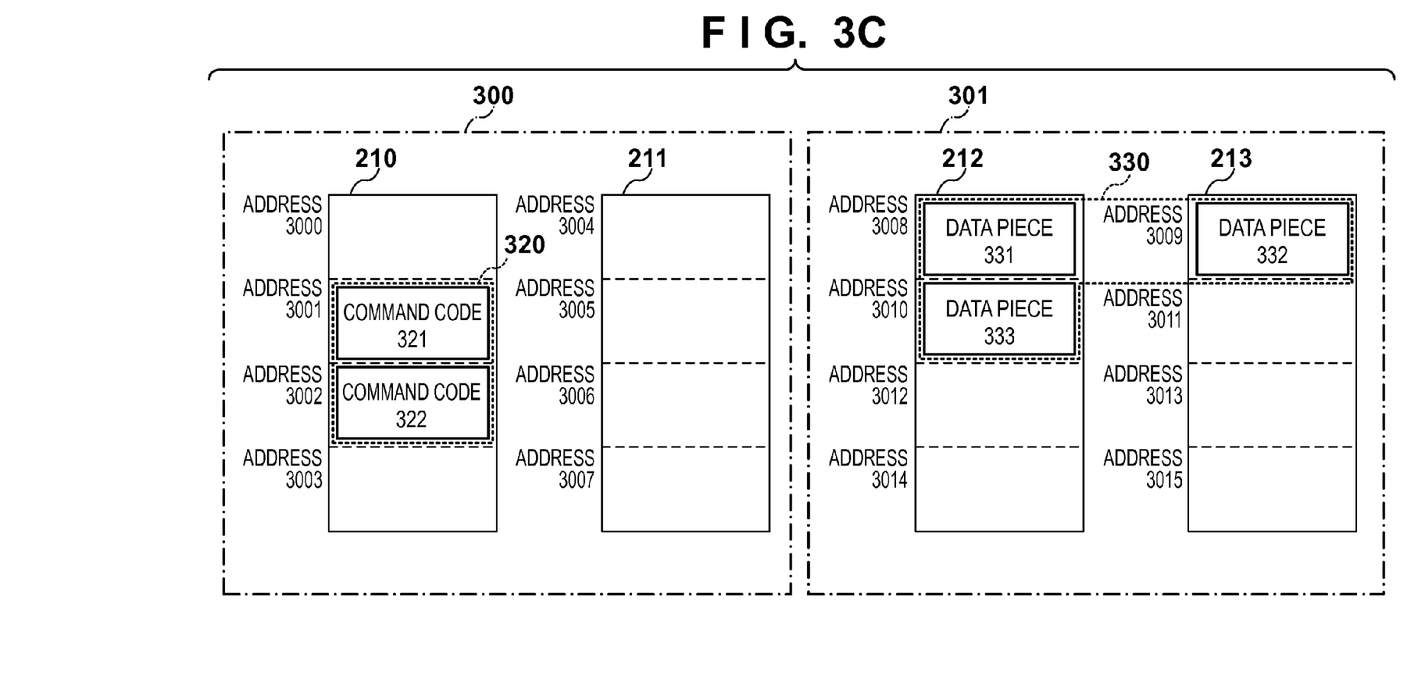
FIG. 3C is a diagram for describing an interleaving configuration.

Furthermore, FIG. 3C shows a configuration of a non-interleaving region and an interleaving region that are composed of the banks 210, 211, 212, and 213, which are configured by four non-volatile memories shown in FIG. 1. In the present embodiment, each bank can be set as interleaving or non-interleaving by the interleaving setting register 270. Because of this, a portion of the storage regions configured by the multiple banks 210 to 213 can be set as interleaving regions, and the other regions can be set as non-interleaving regions. Based on the setting in the bank power control register 260 in FIG. 3A, the power for each of the banks 210, 211, 212, and 213 in FIG. 3C is set to the on state. Also, based on the setting in the interleaving setting register 270 in FIG. 3B, banks 210 and 211 configure a non-interleaving region 300, and the banks 212 and 213 configure an interleaving region 301.

In FIG. 3C, addresses 3000 to 3007 are logical addresses allocated in the non-interleaving region 300, and these addresses are allocated in order from the head to the end of the bank 210, and subsequently from the head to the end of the bank 211 such that they do not span banks. Also, the addresses 3008 to 3015 are logical addresses allocated to the interleaving region, and these logical addresses are allocated alternatingly so as to span the banks.

Note that the examples in FIGS. 3A to 3C show a state in which the two banks 212 and 213 are set to be interleaving, but three or more banks may be set to be interleaving. For example, if the bits 1 to 3 in the interleaving setting register 270 are set to 1, the three banks 211 to 213 will operate with interleaving. Also, multiple interleaving regions may be set, as shown in FIGS. 3A to 3C. More specifically, in FIG. 3C, the non-interleaving region 300 may be set as interleaving. In this case, the interleaving setting register 270 needs to be configured so as to have a depth of two bits or more for each bank so that interleaving regions can be identified. For example, if two bits are provided for each bank, up to three independent interleaving regions can be set as follows: "0: non-interleaving region", "1: interleaving region A", "2: interleaving region B", "3: interleaving region C".

In FIG. 3C, a program 320 is a program code composed of a command code 321 and a command code 322, and is executed by the CPU 200. In the present embodiment, the program 320 is stored in the bank 210 in the non-interleaving region 300. Data 330 is data that is readable and writable by the CPU 200. In the present embodiment, a data piece 331, a data piece 332, and a data piece 333 are parts of data stored so as to span the banks 212 and 213.

Now, assume that the CPU 200 is executing the program 320, and the program 320 includes processing that entails reading or writing access relating to the data 330. Since the data 330 is stored in the interleaving region 301, high-speed access with a low amount of latency can be performed in readout or writing by the CPU 200.

Figure 8:
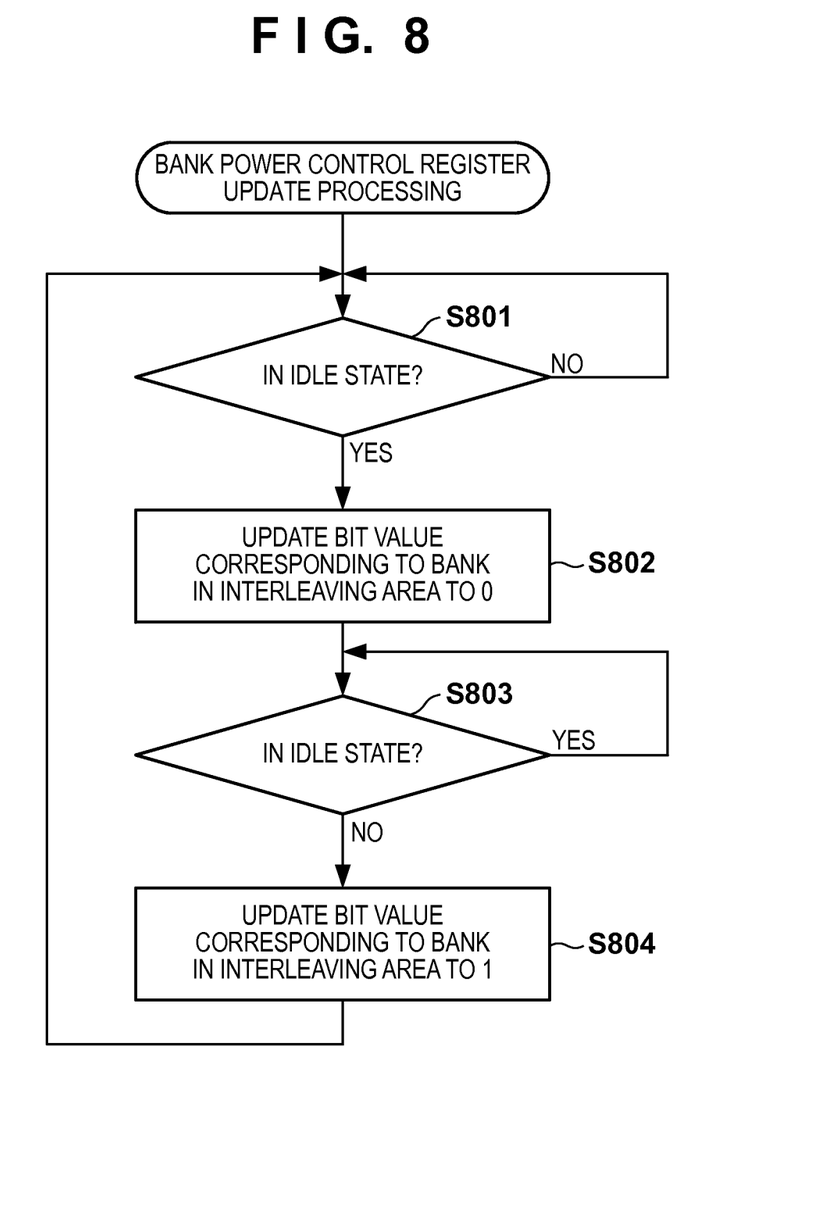
FIG. 8 is a flowchart showing an example of update processing for updating the bank power control register.

Here, the program 320 being executed by the CPU 200 includes update processing for updating the bank power control register 260 shown in the flowchart in FIG. 8. That is to say, in step S801, the CPU 200 waits for a state in which the data 330 is not accessed from a running program. For example, the main processing of the running program 320 enters an idle state (e.g., the apparatus is in a waiting state for saving power), and it is assumed to be in a state in which the data 330 is not accessed. In this case, since the interleaving region 301 is no longer being accessed whatsoever, the banks 212 and 213 included in the interleaving region 301 can be powered off. Accordingly, if it is determined that a state in which the data 330 is not accessed has been entered, the processing moves to step S802, and the CPU 200 sets the bits 2 and 3 in the bank power control register 260 (bits corresponding to banks in the interleaving region) to 0. When the bank power control register 260 is updated in this manner, the bank power control unit 221 switches the power for the banks 212 and 213 to the off state.

Subsequently, in step S803, the CPU 200 waits for a return to a state in which the data 330 is accessed. For example, if the main processing of the running program 320 returns from the idle state to a normal state, the processing moves to step S804. The bits set to 0 in step S802 (in the present example, bits 2 and 3, which correspond to banks in the interleaving region) are set to 1 by the CPU 200 in step S804. When the bank power control register 260 is updated in this manner, the bank power control unit 221 switches the power for the banks 212 and 213 to the on state. Since the banks are non-volatile memories, the data 330 stored in the interleaving region 301 does not disappear even when in the power off state. Accordingly, if the banks 212 and 213 are powered on due to the bits 2 and 3 in the bank power control register 260 being returned to 1, the data 330 can be read out again.

Note that in the first embodiment described above, a program was stored in a non-interleaving region, and data was stored in an interleaving region, but during actual use, the present invention is not limited to this arrangement. Also, in the present embodiment, a case was described in which access to data was not needed during practical use, and an example was described in an interleaving region in which the data is stored was powered on and off. However, the target of powering on or off is not necessarily limited to interleaving regions, and it is apparent that a non-interleaving region may be powered on or off according to the actual method of application. That is to say, in a configuration in which a portion of multiple banks are used as an interleaving region and the other banks are used as a non-interleaving region, it is sufficient that power supply is controlled separately for the banks configuring the interleaving region and for the banks configuring the non-interleaving region. Also, with control of power supply for a non-interleaving region, the power supply may be switched on or off for all banks configuring a non-interleaving region at once, or the power supply may be switched on or off individually for individual banks configuring a non-interleaving region. Furthermore, a case was described in which the CPU 200 accesses the non-interleaving region 300 and the interleaving region 301, but the present invention is not necessarily limited to access from a CPU. For example, access from a peripheral device (not shown) such as a DMA controller is possible.

Regarding the bank power control register 260, for the logic of bits, 0 indicates power off, and 1 indicates power on, but the present invention is not necessarily limited to this logic, and a configuration in which 0 indicates power on and 1 indicates power off for example is possible. Similarly, regarding the interleaving setting register 270, for the logic of the bits, 0 indicates non-interleaving setting, and 1 indicates interleaving setting, but the present invention is not necessarily limited to this logic, and a configuration in which 0 indicates interleaving setting and 1 indicates non-interleaving setting is possible. Also, in the present embodiment, the bank power control unit 221 is built into the memory control unit 220, but the present invention is not limited to this configuration, and the bank power control unit 221 may exist inside another peripheral circuit for example.

As described above, according to the first embodiment, power supply is appropriately controlled in units of banks and power saving effects can be improved in a configuration including both an interleaving region and a non-interleaving region.

Second Embodiment

In the first embodiment, a case was described in which a memory region composed of four banks was divided into two regions, namely a non-interleaving region and an interleaving region. In the second embodiment, a case will be described in which two non-interleaving regions and one interleaving region are included together in a memory region. Below, with reference to FIG. 4A, FIG. 4B, and FIG. 4C, an example will be described in which two non-interleaving regions are set in the memory system described with reference to FIGS. 2A to 2C, and control of power for the banks is performed.

Figure 4A:
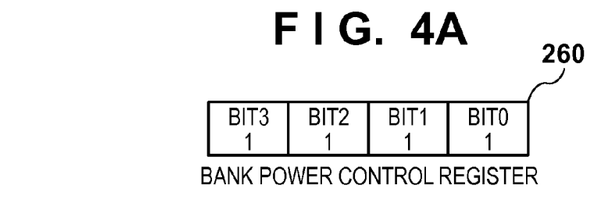
FIG. 4A is a diagram showing a setting state of the bank power control register according to a second embodiment.
Figure 4B:
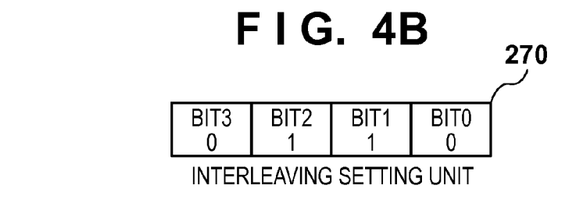
FIG. 4B is a diagram showing a setting state of the interleaving register.
Figure 4C:
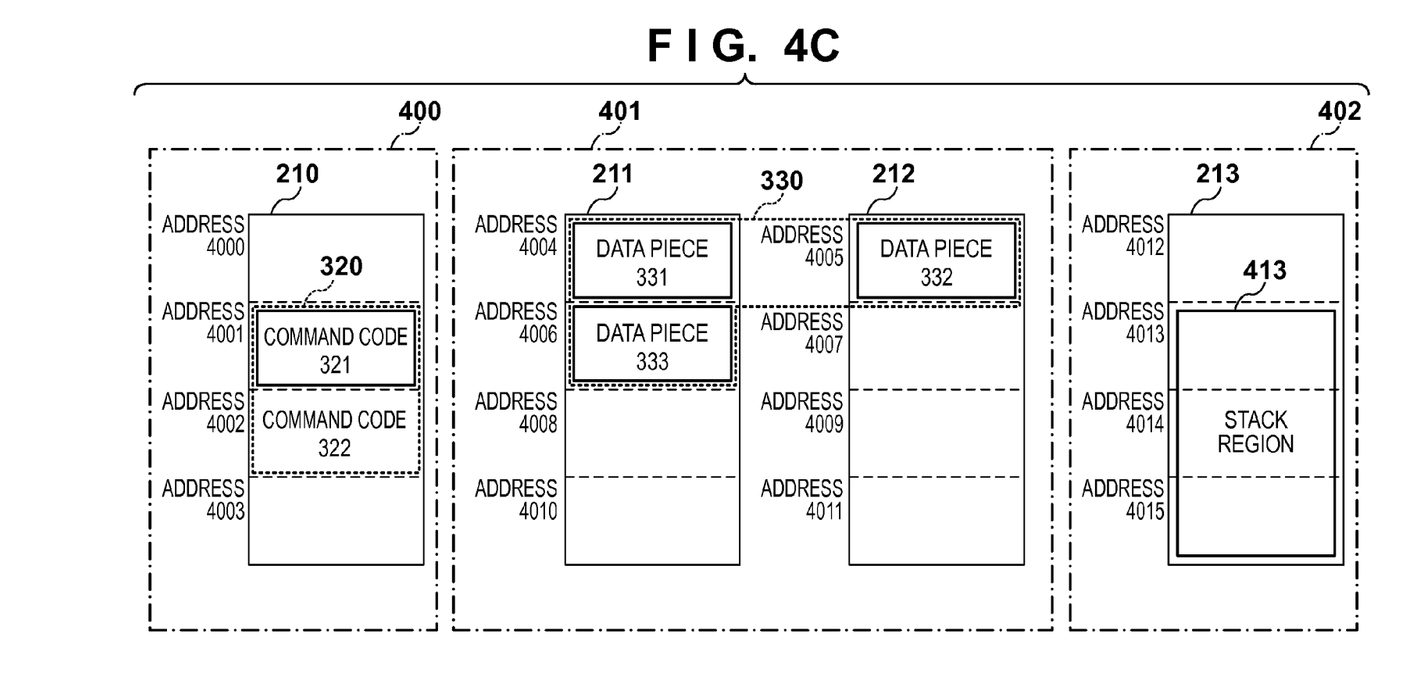
FIG. 4C is a diagram for describing an interleaving configuration.

FIG. 4A shows a state in which all of the bits 0 to 3 in the bank power control register 260 shown in FIG. 2B are set to 1. FIG. 4B shows a state in which the bits 0 and 3 in the interleaving setting register 270 shown in FIG. 2C are set to 0, and the bits 1 and 2 are set to 1. FIG. 4C shows a configuration of non-interleaving regions and an interleaving region composed of the banks 210, 211, 212, and 213, which are configured by the same non-volatile memory as was described in the first embodiment with reference to FIG. 1.

As shown in FIG. 4C, based on the setting of the interleaving setting register 270 in FIG. 4B, the bank 210 configures a non-interleaving region 400, the banks 211 and 212 configure an interleaving region 401, and the bank 213 configures a non-interleaving region 402. Also, based on the setting of the bank power control register 260 in FIG. 4A, each of the banks 210, 211, 212, and 213 are in the power on state.

In FIG. 4C, addresses 4000 to 4003 are logical addresses allocated to the non-interleaving region 400, addresses 4004 to 4011 are logical addresses allocated to the interleaving region 401, and addresses 4012 to 4015 are logical addresses allocated to the non-interleaving region 402. Here, the addresses 4004 to 4011 are alternatingly allocated so as to span the banks 211 and 212 in the interleaving region 401.

The program 320 and the data 330 are similar to those described in the first embodiment. In the second embodiment, the data 330 is stored in the interleaving region 401. That is to say, it is stored such that it spans the banks 211 and 212. A stack region 413 is a stack memory managed and used by the program 320. This stack region 413 is always used for temporary saving and referencing information when the program 320 is executed.

Now, assume that the CPU 200 is executing the program 320, and the program 320 includes processing that entails reading or writing access to the data 330. Since the data 330 is stored in the interleaving region 401, high-speed access with a low amount of latency can be performed in readout or writing by the CPU 200. The program 320 furthermore executes the processing described above using the flowchart in FIG. 8 (update processing for updating the bank power control register 260). As a result, the operation below is realized.

The program 320, which is being executed by the CPU 200, enters the idle state, which is a state in which the data 330 is not accessed. In this case, since the interleaving region 401 is not being accessed whatsoever, the banks 211 and 212 included in the interleaving region 401 can be powered off. Here, when the CPU 200 sets the bits 1 and 2 in the bank power control register 260 to 0, the power for the banks 211 and 212 enters the off state. Since the stack region 413 is always used even when the program 320 is in the idle state, the power on state is maintained for the bank 213, similarly to the bank 210.

As described above, according to the second embodiment, data and programs that need to be accessed during the execution of waiting operations are held in a non-interleaving region, and programs and data that are do not need to be accessed during the execution of waiting operations are held in an interleaving region. Because of this, during waiting operations, power supply to an interleaving region can be stopped and power saving effects can be improved. Note that the non-interleaving regions are regions that can be accessed during waiting operations, and interleaving regions are regions that cannot be accessed during waiting operations, but the present invention is not limited to this. The non-interleaving region may be the region to be powered off during waiting operations. Furthermore, the region indicated by reference numeral 300 in FIG. 3C may be set to be an interleaving region independent from the interleaving region 301, and power supply to the respective interleaving regions may be controlled individually. In such a case, a configuration is possible in which programs or data that need to be accessed during waiting operations can be stored in an interleaving region (region 300 in FIG. 3C) capable of high-speed access, and power is supplied to that region during waiting operations as well.

Since all of the banks are non-volatile memories, the data 330 stored in the interleaving region 401 does not disappear, even when power is switched off. Accordingly, the data 330 can be read out again if the banks 211 and 212 are powered on by the bits 1 and 2 in the bank power control register 260 being returned to 1.

Thus, by temporarily setting banks not needed for operation to the power off state, power consumption can be reduced. Also, since non-volatile memories are used, simply by setting the power for banks to the on state once again, the stored information in the banks can be referenced without requiring any re-writing task whatsoever. Because of this, during idle operations for example, state transitions from waiting operations to normal operations are faster with a program that uses this mechanism.

Third Embodiment

In the first embodiment and the second embodiment, a method was described in which power for the banks is controlled by the CPU 200 setting the bank power control register 260 according to whether memory access to the banks is required or not required. In the aforementioned method, the program being executed by the CPU 200 is aware of the state of data usage. Then, if data access is temporarily not needed, software processing (register setting) was performed by the program, and a bank storing data was powered off. Also, if data access is needed, the corresponding bank was powered on due to the program performing software processing again. In the third embodiment, a method will be described in which control of the powering on and off of the banks is realized by hardware processing rather than by software processing by a program executed by the CPU 200.

Figure 5A:
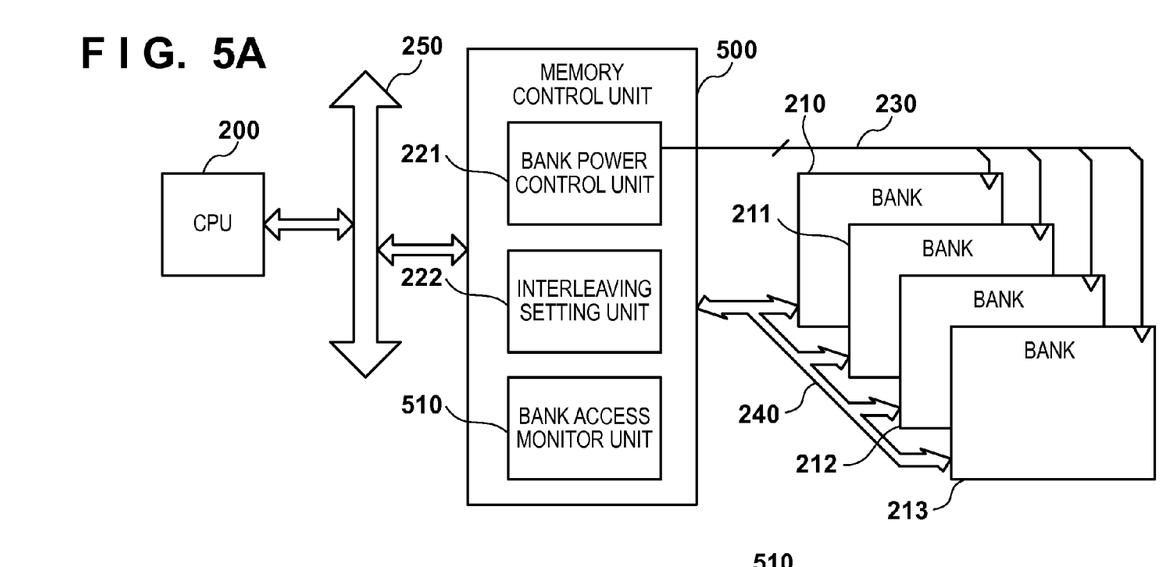
FIG. 5A is a diagram showing an example of a configuration of a memory system according to a third embodiment.

FIG. 5A is a block diagram showing an example of a configuration of a memory system according to the third embodiment. A memory control unit 500 is the memory control unit 220 in FIG. 2A with the addition of a bank access monitor unit 510. The bank access monitor unit 510 is a circuit that monitors how much time has elapsed from the last time the banks were accessed until the present (i.e., the elapse of time during which banks are not being accessed) using a timer counter. Portions other than the memory control unit 500 and the bank access monitor unit 510 are similar to those described in the first embodiment and the second embodiment.

Figure 5B:
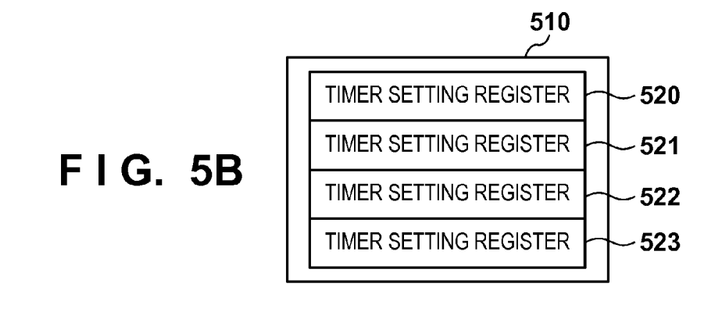
FIG. 5B is a diagram showing a time setting register.

FIG. 5B shows timer setting registers 520, 521, 522, and 523, which are built into the bank access monitor unit 510. The timer registers 520, 521, 522, and 523 correspond to the banks 210, 211, 212, and 213 respectively. The memory control unit 500 measures the duration of non-access to each bank with the bank access monitor unit 510 and compares the durations with register timer setting values. If there is no access to a bank from anywhere and the duration of bank non-access has exceeded the register setting value that corresponds to that bank, the memory control unit 500 sets the bit corresponding to that bank in the bank power control register 260 to 0, and that bank is powered off. However, as is apparent from the first and second embodiments, power supply for banks cannot be switched on and off individually in interleaving regions. Accordingly, if the duration of non-access to all banks configuring an interleaving region exceeds a predetermined duration set by the timer setting register, the bits of those banks in the bank power control register 260 are set to 0. For example, in a case of setting as shown in FIG. 4C, if the durations of non-access in the bank 211 and the bank 212 both exceed the durations set in the timer setting registers 521 and 522, the bits 1 and 2 in the bank power control register 260 are set to 0.

Subsequently, if there is readout or writing access from the CPU 200 to a bank in the power off state, that bank access is detected by the bank access monitor unit 510. When access to a bank in the power off state is detected by the bank access monitor unit 510, power to that bank is switched on again due to the memory control unit 500 setting the bit corresponding to that bank in the bank power control register 260 to 1. Also, the bit corresponding to the bank in the power off state in the bank power control register 260 is set to 1, timer measurement processing relating to that bank is reset, and measurement is started again.

As described above, according to the third embodiment, the present invention has a mechanism that monitors the state of access to banks in the memory control unit 500, and power supply to the banks is switched on and off according to the state of access. Because of this, access state monitoring performed by the CPU 200 and power on/off processing performed by program control are not needed, and the efficiency of the system can be increased.

Note that in the third embodiment, both processing for switching a power supply on and for switching a power supply off are performed with hardware control by the bank access monitor unit 510 and the bank power control unit 221, but the present invention is not necessarily limited to this configuration. For example, the powering on of banks may be performed with software processing by the CPU 200, and the powering off of banks may be performed with hardware control such as that described above. Alternatively, the powering on of banks may be performed with hardware control, and the powering off of banks may be performed with software processing by the CPU 200 (e.g., the processing in FIG. 8).

Fourth Embodiment

Described in the fourth embodiment is an example of a method of determining which physical address in which bank will be associated with any logical address in a memory region in the configurations described in the first embodiment, the second embodiment, and the third embodiment.

The following description takes the example of FIG. 4C, which was described in the second embodiment. First, physical addresses in each bank (i.e., a row address and a column address) are envisioned for the banks 210, 211, 212, and 213 in FIG. 4C. Here, in order to simplify the description, the number of row addresses is assumed to be 2, and the number of column addresses is assumed to be 2 for each bank. Accordingly, the banks are each configured such that: (number of row addresses)×(number of column addresses)=4 addresses.

Figure 6A:
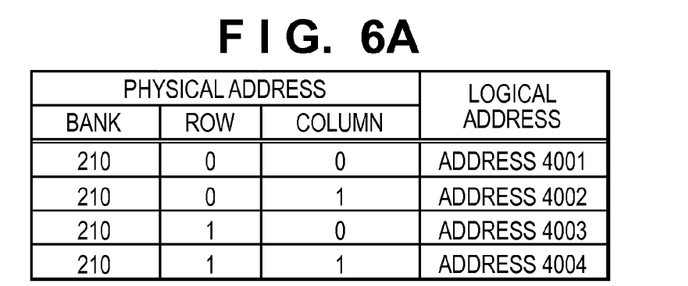
FIG. 6A is a diagram showing physical and logical addresses of a bank 210.
Figure 6B:
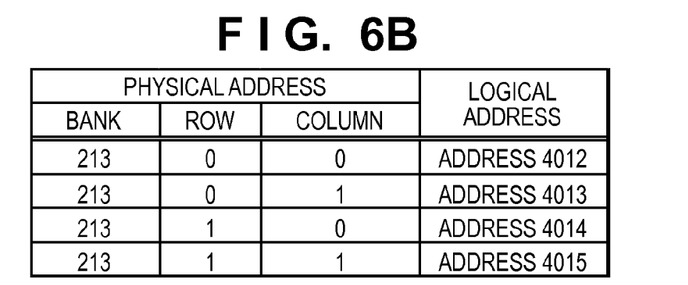
FIG. 6B is a diagram showing physical and logical addresses of a bank 213.

Next, association between the logical addresses 4000, 4001, 4002, and 4003, which are allocated to the bank 210 in the non-interleaving region 400, and the physical addresses in the bank will be considered. When physical addresses in the bank 210 are indicated by a bank number, a row address, and a column address, and their correspondence relationship with logical addresses is arranged, they are in a correspondence relationship as shown in FIG. 6A. Similarly with the bank 213 in the non-interleaving region 402 as well, the bank number, the row and column addresses, and the logical addresses have a correspondence relationship as shown in FIG. 6B.

Figure 6C:
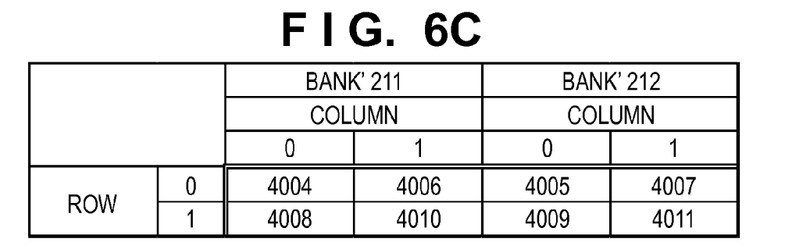
FIG. 6C is a diagram showing physical and logical addresses of a bank 211 and a bank 212.
Figure 6D:
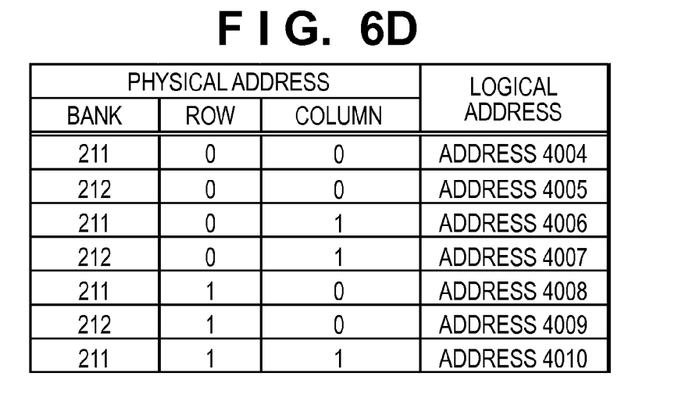
FIG. 6D is a diagram showing physical and logical addresses of the bank 211 and the bank 212.

Furthermore, the banks 211 and 212 in the interleaving region 401 will be considered. As shown in FIG. 4C before, logical addresses are addressed alternatingly so as to span the banks since the banks 211 and 212 configure an interleaving region. That is to say, the addresses 4004, 4006, 4008, and 4010 are allocated to the bank 211, and the addresses 4005, 4007, 4009, and 4011 are allocated to the bank 212. In this state, the correspondence relationship between the row and column addresses in the banks and the logical addresses is as shown in FIG. 6C. FIG. 6D shows an example of this after being rearranged in order of logical address.

Figure 7:
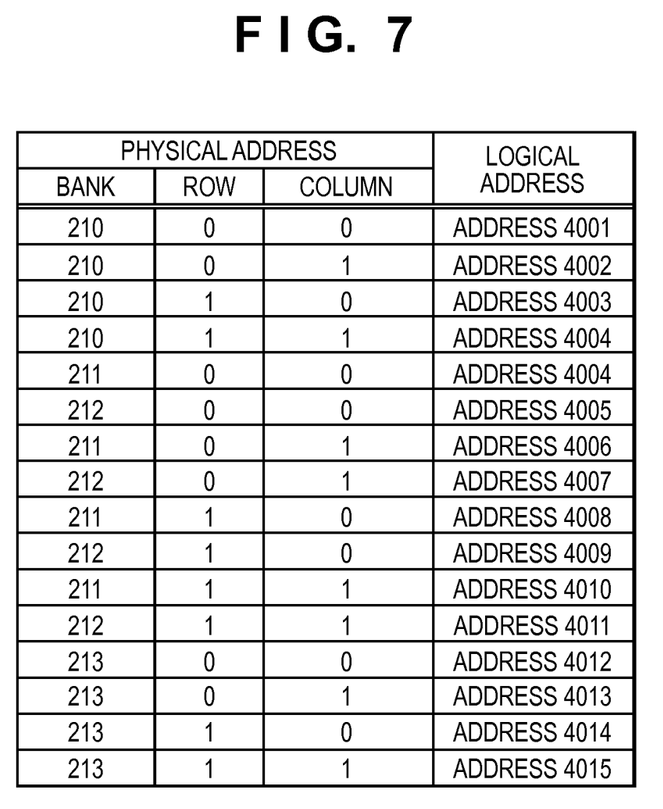
FIG. 7 is a diagram showing physical and logical addresses of the banks 210, 211, 212, and 213, which are shown in FIGS. 6A to 6D.

FIG. 7 is a table in which the aforementioned FIGS. 6A, 6B, and 6D have been compiled into one table and rearranged in order of logical address, and it is a lookup table (hereinafter referred to as an "LUT") that maps logical addresses to physical addresses. For example, if this LUT is built into the memory control unit 220, any logical address that comes from the CPU 200 or a peripheral device (not shown) can be converted into a physical address (bank number, row, and column) by referencing this LUT.

Note that in the actual configuration, the correspondence relationship between logical addresses and physical addresses may be obtained in advance and built into the memory control unit 220 as the LUT. Alternatively, an LUT may be generated by arithmetic processing for conversion from logical addresses into physical addresses as long as there is arithmetic regularity in the correspondence relationship between logical addresses and physical addresses. Alternatively, the correspondence relationship between logical addresses and physical addresses may be obtained by dynamically performing arithmetic processing for conversion from a logical address into a physical address every time memory is accessed rather than having an LUT itself. The present proposal is not limited to these ways of deriving the correspondence relationship between logical addresses and physical addresses.

As described above, according to the above-described embodiment, banks storing data and programs for which high-speed access is needed and banks storing data and programs for which low-speed access is sufficient can be completely separated. Also, if either interleaving regions or non-interleaving regions that were divided temporarily do not need to be accessed, the regions can be powered off individually, which can reduce power consumption.

Note that in the embodiment above, a configuration using an MRAM was described, but the application of the present invention is not limited to a memory system using an MRAM, and the present invention can be suitably applied to all types of memory systems that use a non-volatile memory.

In addition, the above-described memory system can be used in various types of information processing apparatuses and electronic devices, such as digital cameras, video cameras, mobile phones, or tablets, and information processing apparatuses and electronic devices to which the above-described memory system is applied are within the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-161964, filed Jul. 20, 2012, which is hereby incorporated by reference herein in its entirety.

What is claimed is:

1. A control apparatus for controlling a memory having a plurality of banks, comprising:
    an allocation unit configured to allocate the plurality of banks to a first region for interleaving access or a second region for non-interleaving access, respectively;
    a memory access unit configured to perform data transfer to a plurality of banks in the first region by interleaving access, and perform data transfer to at least one bank in the second region by non-interleaving access; and
    a control unit configured to set the plurality of banks in the first region and the at least one bank in the second region independently to one of a low-power state and a normal operation state in accordance with the respective regions to which the plurality of banks are allocated by the allocation unit,
    wherein the control unit sets all of the plurality of banks in the first region to the low-power state if at least one bank in the first region is set to the low-power state, and sets the at least one bank in the second region independently to the low-power state in the bank unit if the at least one bank in the second region is set to the low-power state, and
    wherein the control unit sets all of the plurality of banks in the first region to the normal operation state if the at least one bank in the first region is set to the normal operation state, and sets the at least one bank in the second region independently to the normal operation state in the bank unit if the at least one bank in the second region is set to the normal operation state.

2. The control apparatus according to claim 1, further comprising:
    a CPU,
    wherein a program executed by the CPU is stored in the second region, and data used by the program is stored in the first region.

3. The control apparatus according to claim 1, wherein, if an access request to a bank in the first region has not been issued for a predetermined time period, the control unit sets all of the plurality of banks in the first region to the low-power state while setting the bank in the second region to the normal operation state.

4. The control apparatus according to claim 1, wherein, if the first region is in the low-power state, the control unit sets all of a plurality of banks in the first region to the normal operation state according to an access request to the bank in the first region being issued.

5. The control apparatus according to claim 1, wherein the memory is a non-volatile memory.

6. The control apparatus according to claim 1, wherein the control unit sets a bank to the low-power state by stopping a supply of power to the bank.

7. The control apparatus according to claim 1, wherein the allocation unit allocates the plurality of banks to the first region and the second region in unit of bank.

8. The control apparatus according to claim 1, wherein the allocation unit does not allocate a bank, which is allocated to the first region, to the second region and does not allocate a bank, which is allocated to the second region, to the first region.

9. The control apparatus according to claim 1, wherein the memory access unit does not perform data transfer to the plurality of banks in the first region by non-interleaving access, and does not perform data transfer to the at least one bank in the second region by interleaving access.

10. A method of controlling a memory having a plurality of banks, comprising:
    allocating the plurality of banks to a first region for interleaving access or a second region for non-interleaving access, respectively;
    performing data transfer to a plurality of banks in the first region by interleaving access, and performing data transfer to at least one bank in the second region by non-interleaving access; and
    setting the plurality of banks in the first region and the bank in the second region independently to one of a low-power state and a normal operation state in accordance with the respective regions to which the plurality of banks are allocated by the allocating,
    wherein all of the plurality of banks in the first region are set to the low-power state if at least one bank in the first region is set to the low-power state, and the at least one bank in the second region is independently set to the normal operation state in the bank unit if the at least one bank in the second region is set to the low-power state, and
    wherein all of the plurality of banks in the first region are set to the normal operation state if the at least one bank in the first region is set to the normal operation state, and the at least one bank in the second region is independently set to the low-power state in the bank unit if the at least one bank in the second region is set to the normal operation state.

11. The method according to claim 10, wherein a program executed by a CPU that accesses the memory is stored in the second region, and data used by the program is stored in the first region.

12. The method according to claim 10, wherein the setting includes, if an access request to a bank in the first region has not been issued for a predetermined time period, setting all of the plurality of banks in the first region is set to the low-power state while the bank in the second region is set to the normal operation state.

13. The method according to claim 10, wherein the setting includes, if the first region is in the low-power state, setting all of the plurality of banks in the first region to the normal operation state according to an access request to the bank in the first region being issued.

14. The method according to claim 10, wherein
    the setting includes setting a bank to the low-power state by stopping a supply of power to the bank.

15. An electronic apparatus comprising:
    a memory having a plurality of banks;
    a CPU that accesses the memory;
    an allocation unit configured to allocate the plurality of banks to a first region for interleaving access or a second region for non-interleaving access, respectively;
    a memory access unit configured to perform data transfer to a plurality of banks in the first region by interleaving access, and perform data transfer to at least one bank in the second region by non-interleaving access; and
    a control unit configured to control power supply to the plurality of banks in the first region and the at least one bank in the second region independently in accordance with the respective regions to which the plurality of banks are allocated by the allocation unit, wherein the control unit sets all of the plurality of banks in the first region to the low-power state if at least one bank in the first region is set to the low-power state, and sets the at least one bank in the second region independently to the low-power state in the bank unit if the at least one bank in the second region is set to the low-power state, and wherein the control unit sets all of the plurality of banks in the first region to the normal operation state if the at least one bank in the first region is set to the normal operation state, and sets the at least one bank in the second region independently to the normal operation state in the bank unit if the at least one bank in the second region is set to the normal operation state.

* * * * *